United States Patent
Wada et al.

[11] Patent Number: 5,867,231
[45] Date of Patent: Feb. 2, 1999

[54] METHOD AND APPARATUS FOR DECODING VIDEO SIGNAL

[75] Inventors: Toru Wada, Saitama; Takashi Fukuyama, Takashi, both of Japan

[73] Assignee: Sony Corporation, Tokyo, Japan

[21] Appl. No.: 591,686

[22] Filed: Jan. 25, 1996

[30] Foreign Application Priority Data

Jan. 31, 1995 [JP] Japan .................................. 7-036093

[51] Int. Cl.⁶ .................................................. H04N 7/10
[52] U.S. Cl. .................................. 348/845.1; 348/845.2; 348/466; 348/415; 348/416; 348/411
[58] Field of Search .................................. 348/419, 415, 348/416, 411, 405, 420, 423, 461, 464, 466, 845.1, 845.2, 699

[56] References Cited

U.S. PATENT DOCUMENTS

| | | | |
|---|---|---|---|
| 5,497,404 | 3/1996 | Grover et al. | 375/357 |
| 5,502,493 | 3/1996 | Meyer | 348/426 |
| 5,543,931 | 8/1996 | Lee et al. | 358/335 |
| 5,574,568 | 11/1996 | Juri et al. | 386/112 |

*Primary Examiner*—Tommy P. Chin
*Assistant Examiner*—Anand S. Rao
*Attorney, Agent, or Firm*—Frommer Lawrence & Haug, LLP; William S. Frommer

[57] ABSTRACT

A method for decoding a video signal in which the decoding operation is completed within a predetermined time irrespective of the presence of an error which is generated on a bit strings. In the case where a bit strings formed by coding a video signal for each of predetermined blocks, the decoding operation is suspended upon the detection of the presence of an error in the bit strings followed by resuming the decoding operation from any of the synchronous codes present on the bit strings. At this time, it is judged on the basis of the position of the error detected from the bit strings as to from which synchronous code out of the synchronous codes present on the bit strings the decoding operation is resumed thereby completing within a predetermined time the decoding operation of a series of data groups including an error part of the bit strings.

7 Claims, 9 Drawing Sheets

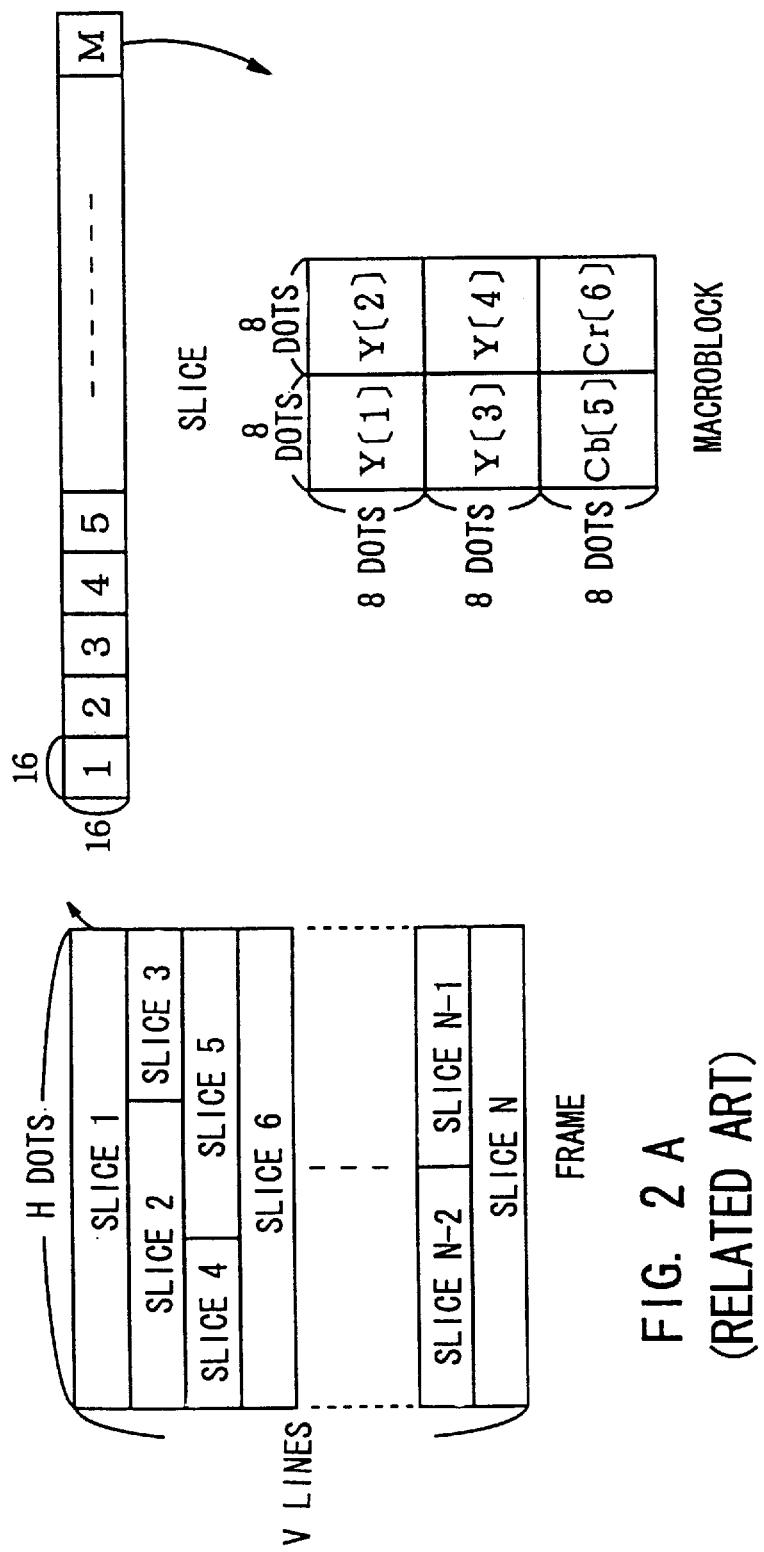

CASE WHERE ERROR IS DETECTED AT THE SAME TIME WHEN ERROR IS GENERATED

CASE WHERE ERROR IS DETECTED BEYOND SLICE AFTER ERROR GENERATION

CASE WHERE ERROR IS DETECTED SOON AFTER ERROR IS GENERATED

CASE WHERE ERROR IS DETECTED BEYOND SLICE AFTER ERROR GENERATION

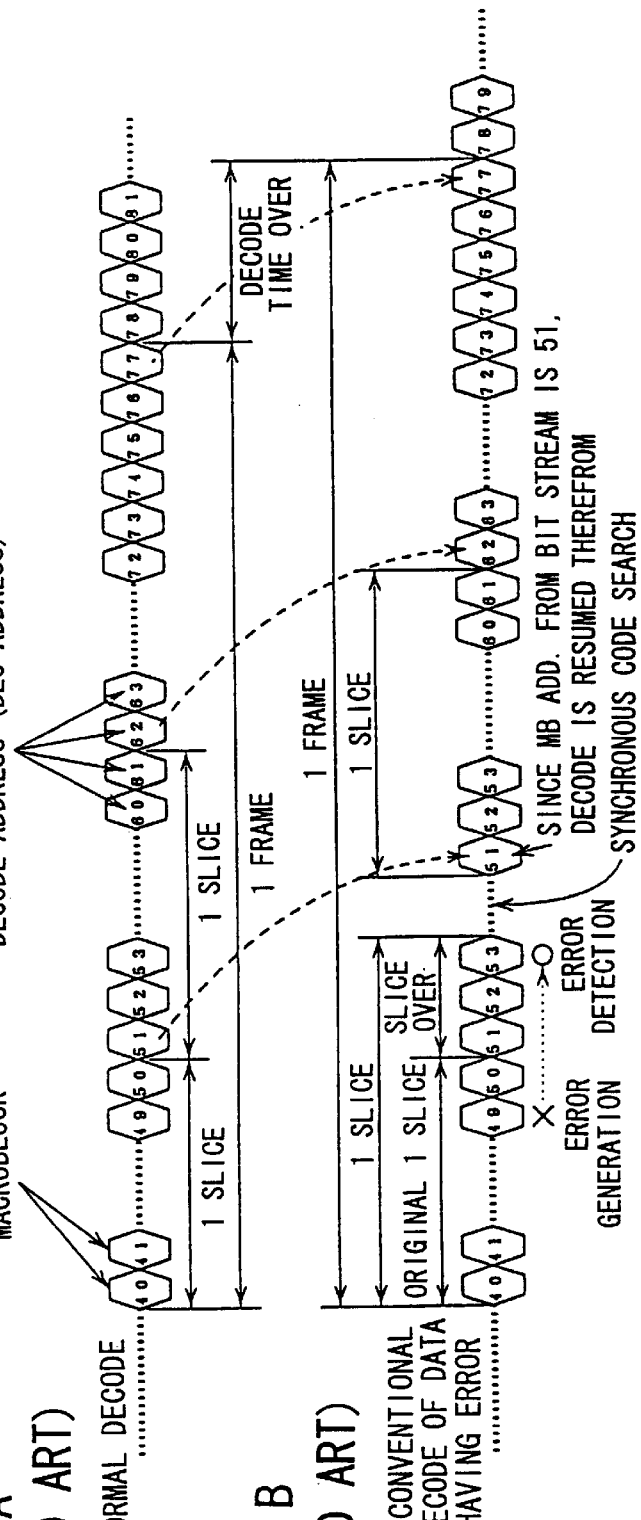

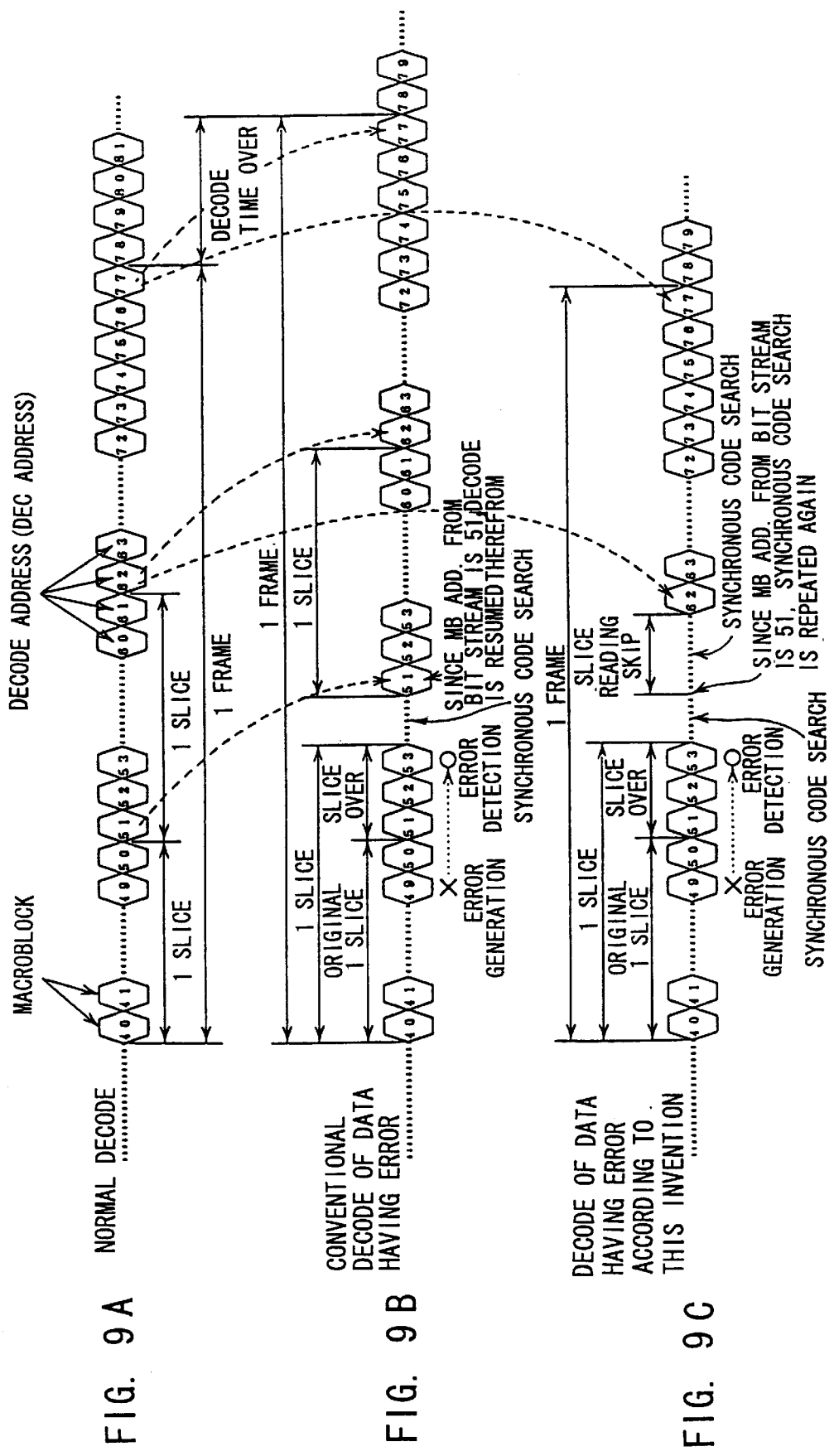

METHOD AND APPARATUS FOR DECODING VIDEO SIGNAL

BACKGROUND OF THE INVENTIONS

Field of the Invention

This invention relates to a video signal decoding apparatus, and more particularly, is preferably used in a recording and reproducing apparatus for recording and reproducing a moving picture signal on a recording medium such as a magneto-optical disc and a magnetic tape, and in a receiving apparatus of a television conference system for sending and receiving the moving picture signal via a transmission line.

Conventionally, in a system of transmitting a moving picture signal to a remote place, such as a television conference system, video telephone system, a broadcasting system or the like, a method is adopted for compressing and coding the video signal by using a line correlation and a correlation between frames to use the transmission line very efficiently. For example, when the line correlation is used, the video signal can be compressed by using orthogonal transform coding processing (for example, discrete cosine transform (DCT)). Furthermore, when the correlation between frames is used, the video signal can be further compressed.

Normally, frame images adjacent to each other in terms of time do not show a large change. In other words, when a difference between the images is calculated, the difference signal becomes a small value. Then the difference signal is coded to compress the code amount. However, the original image cannot be restored only by sending the difference signal. Consequently, a method is adopted for compressing and coding the video signal by converting each frame image into either of three kinds of frame format, an I picture, a P picture, and a B picture.

The coding method is shown in FIGS. 1A and 1B. In the compressing and coding method, a series of frame group is processed in a unit of seventeen frames (frame F1 through F17). The unit of processing is referred to as a group of pictures. The group of pictures is coded into an I picture, a B picture, and a P picture respectively from the frame F1. After that, the frames F4 through F7 after the fourth frame are alternately coded into the B picture and the P picture.

Here, the I picture is a picture obtained by coding one frame portion of video signal as it is. Further, as shown in FIG. 1A, the P picture is basically a picture obtained by coding a difference in the video signal with respect to the I picture located ahead in time or a difference in the video signal with respect to the P picture located ahead in time. In addition, as shown in FIG. 1B, the B picture is basically a picture obtained by coding a difference in the video signal with respect to an average value between the frame located ahead in time and the frame located at the back in time. This coding method is referred to as a bidirectional prediction coding.

For reference, with the B picture, three kinds of coding methods are actually used in addition to the bidirectional coding method. In a first processing method, the original frame F2 is transmitted as it is as a transmission data item. This method is referred to as an intra coding which method is the same as the I picture. In the second processing method, a difference from the frame F3 located at the back in time is calculated to transmit the difference. This is referred to as a backward prediction coding.

Furthermore, in the third processing method, a difference with the frame F1 located ahead in time is transmitted. This is referred to as a forward prediction coding.

Then at the coding time, data coded in a method in which the transmission data reduced to the least amount is adopted as the B picture out of the aforementioned four coding methods.

In the actual coding apparatus, the video signal in these frame formats (I picture, P picture, or B picture) is further converted into a block format signal to be transmitted as a bit stream.

This block format is shown in FIGS. 2A to 2C. As shown in FIGS. 2A to 2C, the frame format video signal comprises a collection of V lines of lines comprising H dots per line.

One frame video signal is segmented into N slices with no definite length by setting sixteen lines as one unit. Each slice comprises M macro blocks. Each macro block comprises a luminance signal corresponding to 16×16 pixels (dots). The luminance signal is segmented into blocks Y[1] through Y[4] having 8×8 dots as one unit. Color signals Cb and Cr having 8×8 dots correspond to the luminance signal having 16×16 dots.

The decoding apparatus is constituted to obtain a video signal by receiving and decoding the bit stream converted into the block format via the recording medium and the transmission line.

By the way, in the case where some errors are present in the received bit stream, the decoding apparatus inserts the error start code $D_{ES}$ into the bit stream to provide this data to the variable length decoding circuit on the rear stage.

The variable length decoding circuit is operated so that the circuit analyzes and decodes the bit stream normally subsequently input to provide the decoded bit stream to the rear stage circuit, and provides each kind of control parameter to each part on the rear stage. The variable length coding circuit is constituted so that the decoding operation is suspended in the case where such an error start code $D_{ES}$ is detected.

The variable length coding circuit proceeds to an operation of retrieving the subsequent synchronous code from the bit stream, at the same time as the suspension, to jump the reading of the decoding operation of the bit stream subsequently input up to a position where the synchronous code is detected. Then the variable length coding circuit is constituted so as to resume the decoding operation when the synchronous code is detected.

This state will be explained by using FIG. 3. As shown in FIG. 3, the bit stream of the image data comprises a header part and a data part. Here, the frame header denotes the header of the frame while the slice header denotes the header of each slice which constitutes this frame. Furthermore, a macroblock (MB) header denotes a header of each macro block which constitutes each of these slices. Then the following block data denotes actual data in each block.

The synchronous code is inserted into the slice header and the frame header. The synchronous code is not included in the macroblock header. Consequently, the unit in which the variable length decoding circuit resumes the decoding operation is normally slice or frame.

At this time, the address in the vertical direction of the screen has been inputted in the slice header. Then, the address in the horizontal direction of the screen has been inputted in the macroblock header at the head of the slice. Consequently, when the decoding operation is resumed, the position on the screen of the reproduced image can be correctly judged.

However, in the case where an error is detected in the decoding operation, it is difficult to judge from what position of the bit stream an error is present in the decoding operation. Consequently, it is impossible to judge whether the decoding operation at that time is correct or not. Since the bit stream is a data item whose variable length is coded, an error cannot be detected soon even when an error is generated in the bit because the pattern fits into the variable length.

For example, there is a bit stream of "00111011101." In the case of variable length decoding processing, the bit stream is to be originally decoded in such a manner as "001" "101" and "1101". However, because of the error generated in the bit stream, in the case where the bit stream is given as "0111011101", the bit stream is variably coded in such a manner as "01," "11," "01," "11". . . .

However, even when the bit stream is variably decoded by mistake, it is impossible to judge from which position the variable length decoding processing is wrong. In other words, even when an error is generated, the error cannot be always detected soon.

Consequently, there is a case in which the decoding operation is completed within the time allocated to the data processing of one frame depending on the state of the error position and the detection position. This fact will be explained by using FIGS. 4A to 4D.

In the beginning, as shown in FIG. 4A, in the case where, for example, the error generation is detected as an error, and as shown in FIG. 4B, in the case where the error is detected soon after the error is generated, the image can be reproduced without interrupting processing time when the decoding operation is resumed from the following synchronous code. For reference, in an example shown in FIG. 4B, the case in which "the error is detected soon after the error is generated" means that the image data obtained by the variable length decoding until the error detection belongs to the inside of the slice where an error is present. Consequently, time required for decoding up to this time is within the time required for the decoding of the slice.

However, as shown in FIGS. 4C or 4D, in the case where the pixel number of the image data decoded until it is detected after the error generation exceeds the pixel number which belongs to the original slice, namely in the case where the process has progressed to a place which should be decoded after the position segmented by the subsequent synchronous code, there is a problem in that the image data located at the same position where the decoding operation is resumed from the position of the synchronous code detected next from the error detection is decoded in a repeated manner so that the time required for the decoding operation becomes insufficient.

This one example is shown in FIGS. 5A and 5B. The slice part constituted of the macroblocks numbered 40th to 50th is decoded in such a manner that the macroblocks after 50th are present because of an error of the variable length decoding operation. In the case of this example, the variable length decoding circuit detects the error at the time when the 53rd macroblock is obtained. Then, the synchronous code provided on the subsequent slice header is detected to resume the decoding operation. At this time, in the slice head, the storage of the macroblocks after the 51st macroblock is recorded as the macroblock address. The 51st macroblock, 52nd macroblock . . . are subsequently decoded at the same time when the decoding operation is resumed. In other words, time required for the processing of the 51st macroblock, the 52nd macroblock and 53rd macroblock will be doubled.

However, time required for the decoding of one frame image is originally determined. In this manner, it sometimes happens that the decoding operation is not completed within the time of decoding one frame by overlapping the image in the same part on the screen.

SUMMARY OF THE INVENTION

In view of the foregoing, an object of this invention is to provide a video signal decoding apparatus which is capable of, within the predetermined time of coding without fail, completing the decoding processing of one frame including an error, even in the case where the decoding operation which has been suspended because an error was detected in the bit stream is returned from the position of the synchronous code present after the decoding operation which has been suspended.

The foregoing object and other objects of the invention have been achieved by the provision of a video signal decoding apparatus, in which when the decoding operation for subsequently decoding the bit strings of the video signal coded for each of predetermined blocks is suspended because of the error detection, it is determined as to from which synchronous code out of the synchronous codes present on the bit strings the decoding operation of a series of data including the error on the bit strings the decoding operation is resumed in accordance with the error position detected from the bit strings so that the decoding a series of data group including the error part of the bit strings is completed within time.

In this manner, the position for resuming the decoding operation is determined in accordance with the error detection position so that decoding operation of a series of data group including the error on the bit strings is completed within time. In this manner, the present invention can realize a method and apparatus for decoding the video signal which are capable of completing a series of decoding operation within a predetermined time which is determined in advance even when an error is generated.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 2A to 2C are schematic views illustrating a data structure of the image data;

FIGS. 5A and 5B are timing charts showing a decode processing result obtained in the prior art;

FIGS. 9A to 9C are timing charts showing a decode processing result obtained in the case of the embodiment.

DETAILED DESCRIPTION OF THE EMBODIMENT

Figures 1A, 1B:
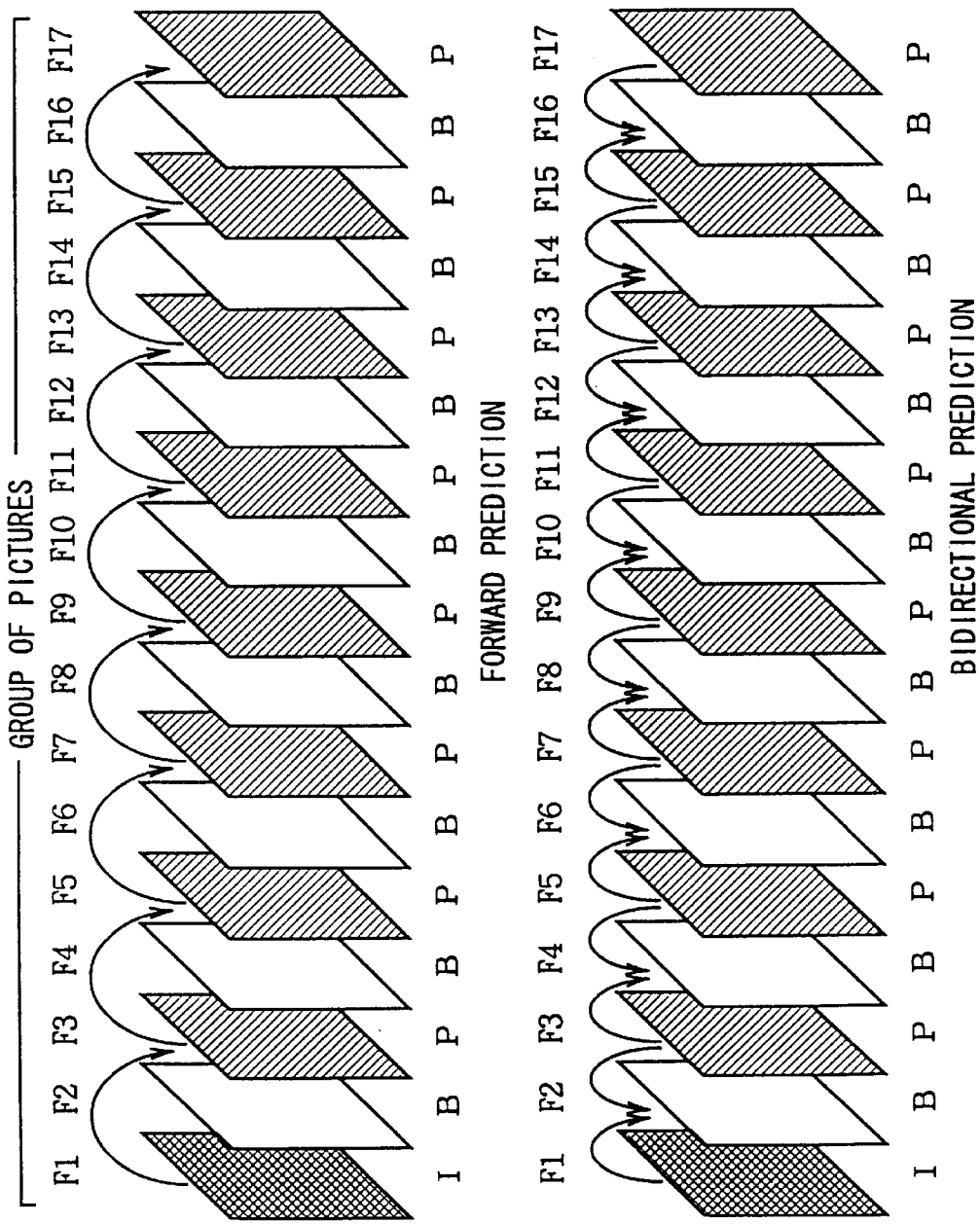
FIGS. 1A and 1B are schematic views explaining a type of picture used in compressing image data.
Figure 3:
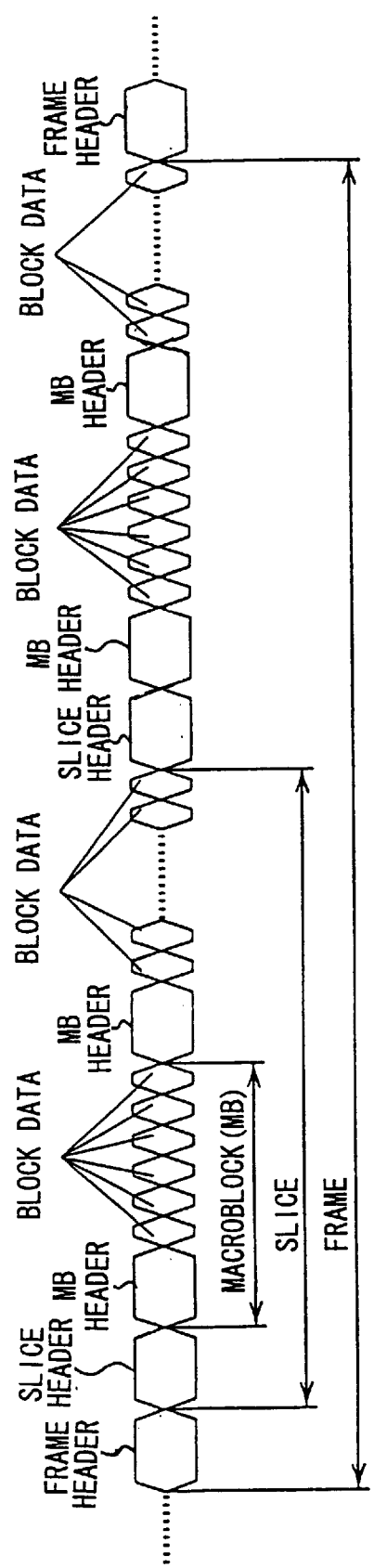
FIG. 3 is a schematic view showing a structure of a bit stream.
Figure 4A:
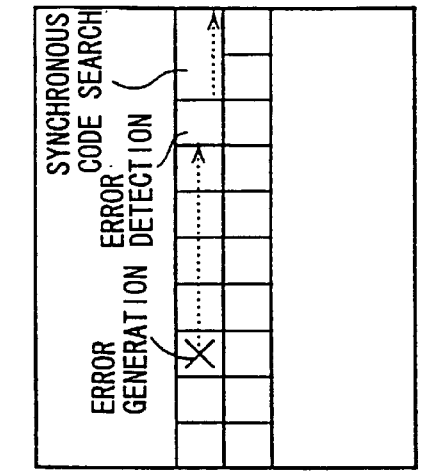
FIGS. 4A to 4D are schematic views showing a state of position relations between an error generation position and an error detection position.
Figure 4C:
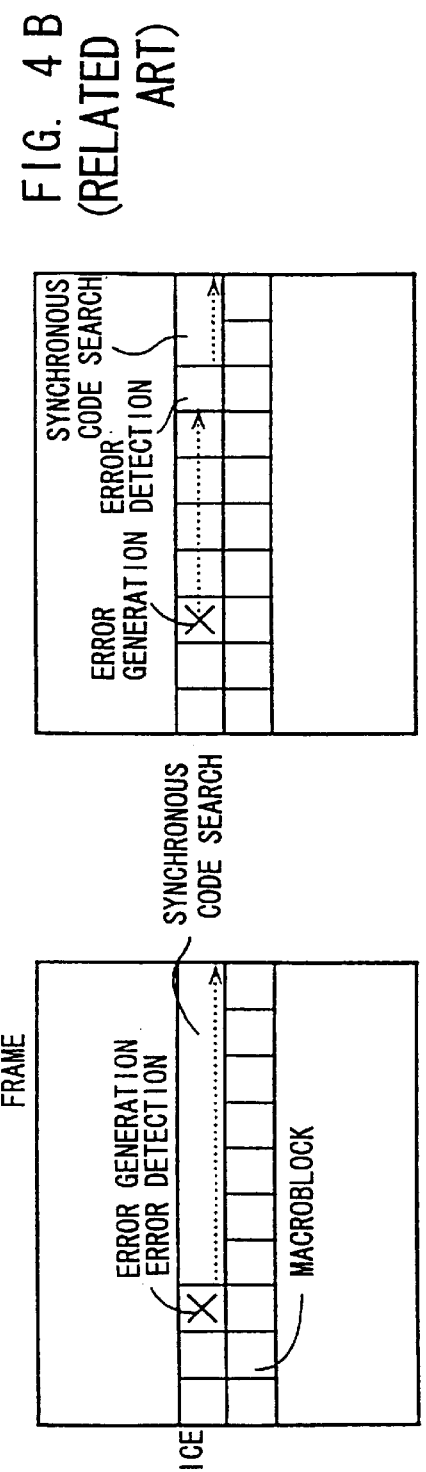
Figure 4B:
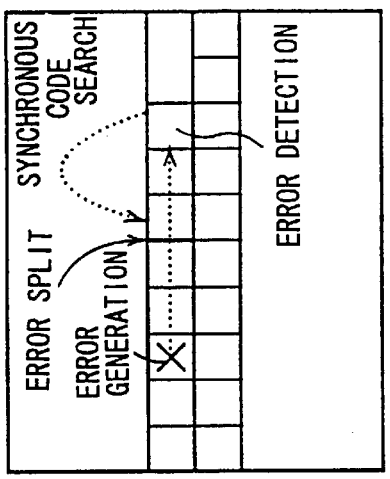
Figure 4D:
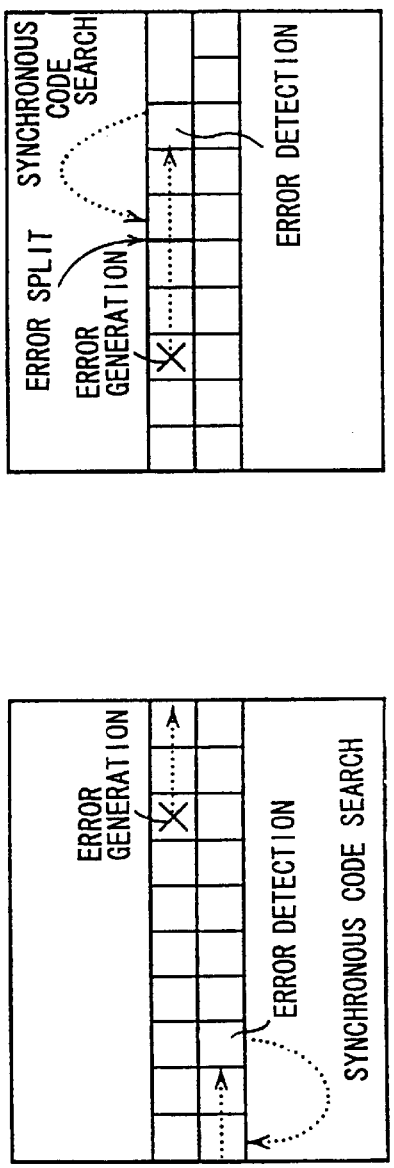
Figure 6:
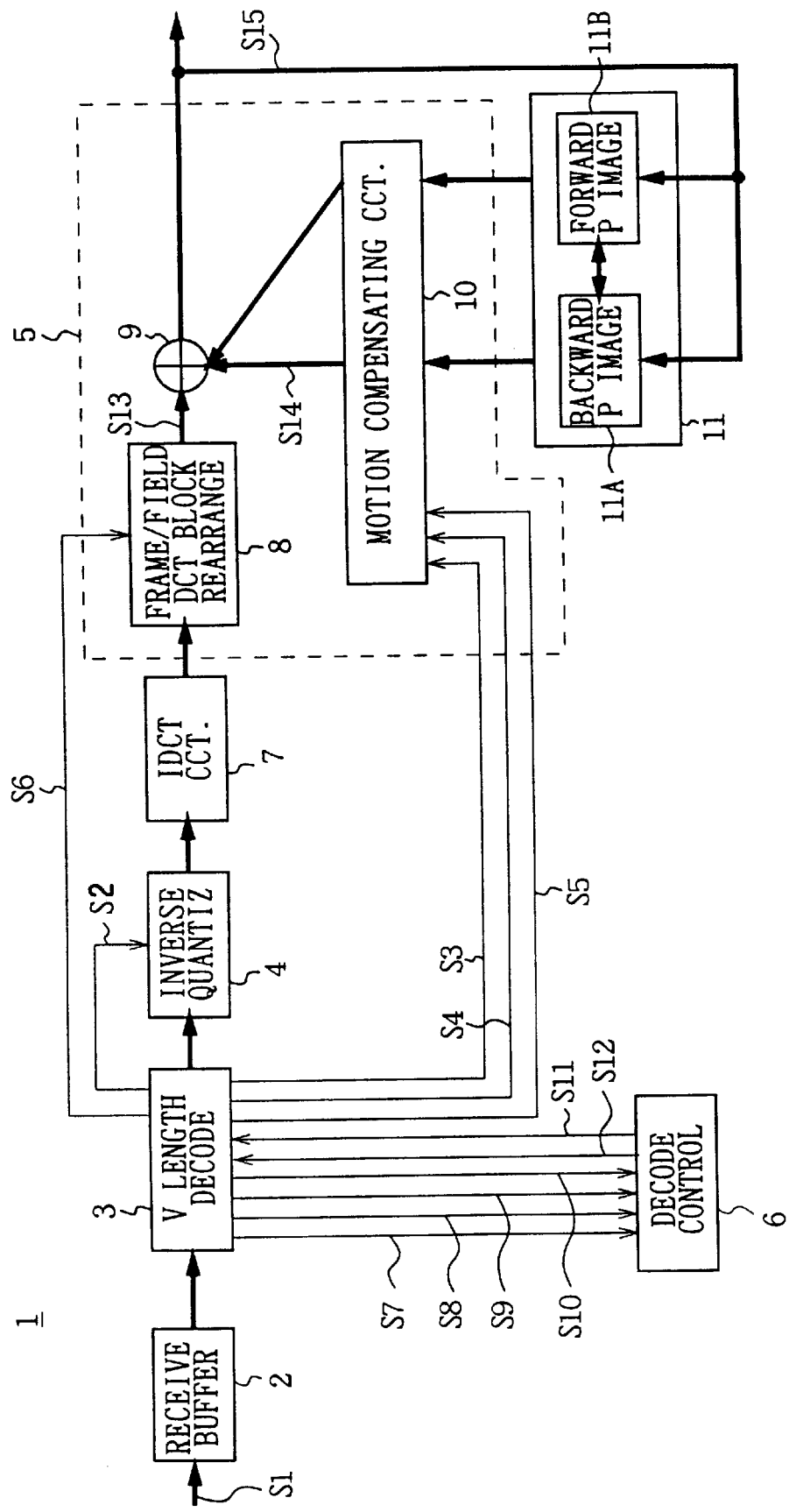
FIG. 6 is a block diagram showing a video signal decoding apparatus according to one embodiment of the present invention.

Preferred embodiments of the present invention will be described with reference to the accompanying drawings:
(1) Structure of Decode Processing Circuit
(1—1) Overall Structure Here, an explanation is given on an outline of a decode processing circuit having a function of setting the position of resuming the decoding operation by the variable length decoding circuit and adjusting the time required for the processing after the resuming the operation so that the time can be included in time for decode processing of one frame in the case where the error start code $D_{ES}$ is detected from the bit stream, or in the case where an error is detected in the variable length decoding operation. An overall structure of the decode processing circuit with this function is shown in FIG. 6.

A decode processing circuit 1 temporarily memorizes the image data by incorporating the bit stream S1 of the image data into a receiving buffer 2 via a recording medium or a transmission line.

A variable length decoding circuit 3 determines the image data by variable length decoding of the bit stream read out from receiving buffer 2 and provides the bit stream to an inverse quantizing circuit 4. At the same time, each kind of flag information S2 to S6 used in the processing in the rear stage is output to the inverse quantizing circuit 4 and a motion compensating circuit part 5. Here, flag information S2 to S6 refers to a quantization step S2, a motion vector S3, a prediction mode S4 (information relating to the prediction in macroblock type), a frame/field prediction flag S5 (hereinafter referred to as a prediction flag S5), and frame/field DCT flag S6 (hereinafter referred to as DCT flag S6).

Furthermore, the variable length decoding circuit 3 performs the variable length decoding operation on the basis of each kind of control signals S7 to S12 sent and received with a decode control circuit 6. Here, the control signals S7 to S12 refer to a macroblock decode end signal S7, an error detection signal S8, a synchronous code detection/judgement signal S9, a macroblock address S10, a synchronous code search signal S1, and a decode start signal S12.

The variable length decoding circuit 3 changes over between the suspension of the decoding operation and the resumption on the basis of the instruction of the decode start signal S12 out of the aforementioned control signal. Detailed operation thereof will be explained in the following sections.

The image data decoded from the variable length decoding circuit 3 is provided to the inverse quantizing circuit 4. The inverse quantizing circuit 4 inverse quantizes the data input on the basis of the quantization scale S2 and the result of the processing is output to an IDCT circuit 7.

The IDCT circuit 7 performs the inverse DCT processing on the data (DCT coefficient) obtained from the inverse quantizing circuit 4. The result of the processing is supplied to the motion compensating circuit part 5. At this time, the output data of the IDCT circuit 7 is input to a frame/field DCT block rearranging circuit 8.

The frame/field DCT block rearranging circuit 8 rearranges the data input from the IDCT circuit on the basis of the instruction of the DCT flag S6 and outputs the image data S13 to a calculator 9.

The calculator 9 calculates (for example, adds) a reproduction video signal S15 on the basis of the image data S13 obtained in the aforementioned process and the prediction image data S14 input from a motion compensating circuit 10, and outputs the image data to the rear stage circuit.

Here, the motion compensating circuit 10 generates the prediction image data S14 on the basis of the image data which is stored in the frame memory 11. For example, in the case where the image data S13 is the I picture, the image data S13 is output from the calculator 9 as a reproduction video signal S15 as it is. Since the frame memory 11 generates the prediction image data S14 of the image data (P picture or B picture data) S13, the reproduction video signal S15 is memorized in the forward prediction image part 11B.

In the case where the image data S13 to be input is the data of the P picture in which image data before one frame is given as a prediction image data and the data is in the forward prediction mode, the motion compensating circuit 10 reads the image data (I picture data) one frame before from the forward prediction image part 11B which is motion compensated on the basis of the motion vector S3 provided by the variable length decoding circuit 3 to generate the prediction image data S14.

The data obtained by adding the prediction image data S14 and the image data (difference data) S13 at the calculator 9 constitutes the following reproduced video signal S15.

Since the reproduction video signal S15 is the image data of the P picture and the following image data is either the B picture or the P picture, the reproduction video signal S15 is memorized in the backward prediction image part 11A of the frame memory 11.

For reference, even with the image data of the P picture, in the case of the data coded in the image inside prediction mode, the image data is output as it is from the calculator 9 in the same manner as the image data of the I picture. Consequently, in this case, the reproduction video signal S15 is memorized in the forward prediction image part 11B.

In this state, in the case where the image data to be input next is the B picture, and at the same time, the prediction mode S4 is the forward prediction mode, the motion compensating circuit 10 reads the image data of the I picture from the forward prediction image part 11B in accordance with the prediction mode S4. The motion compensating circuit is operated for the motion compensation with the motion vector S3.

In contrast, in the case where the image data to be input next is the B picture, and the prediction mode S4 is coded with the backward prediction mode, the motion compensating circuit 10 reads the image data of the P picture from the backward prediction image part 11A in accordance with the prediction mode S4. The motion compensating circuit is operated for the motion compensation with the motion vector S3.

In addition, in the case where the image data to be input is the B picture and the prediction mode S4 is the bidirectional prediction mode, the motion compensating circuit 10 reads the image data of the I picture and the P picture from the forward prediction image part 11B and the backward prediction image part 11A in accordance with the prediction mode S4. The motion compensating circuit is operated for the motion compensation with the motion vector S3. In such a manner, the prediction image data S14 is generated.

However, the addition output from the calculator 9 is the image data of the B picture, and the image data is not used for the generation of the prediction image of other images so that the image is not memorized in the frame memory 11.

After these B picture images are output, the motion compensating circuit 10 reads the image data of the P picture which is memorized in the backward prediction image part 11A. The motion compensating circuit 10 is operated to supply the image data to the calculator 9. However, there is no motion compensation with respect to the P picture.

Lastly, in the decode processing circuit 1, no circuit is shown which corresponds to the prediction mode switch circuit and the DCT mode switch circuit on the decoding apparatus side. The motion compensating circuit 10 performs the processing corresponding to these circuit, the processing of bringing, if necessary, a structure in which the odd field line signal and the even field line signal are separated to the original structure in which the two signals are mixed.

Further, an explanation is given on the processing of the luminance signal in the aforementioned explanation, and the same thing holds true of the processing of the chrominance signal. However, in this case, as the motion vector, the vector for the luminance signal is set to 1/2 in the vertical and the horizontal directions.

(1-2) Decode Control Circuit
(1-2-1) Circuit Structure

Figure 7:
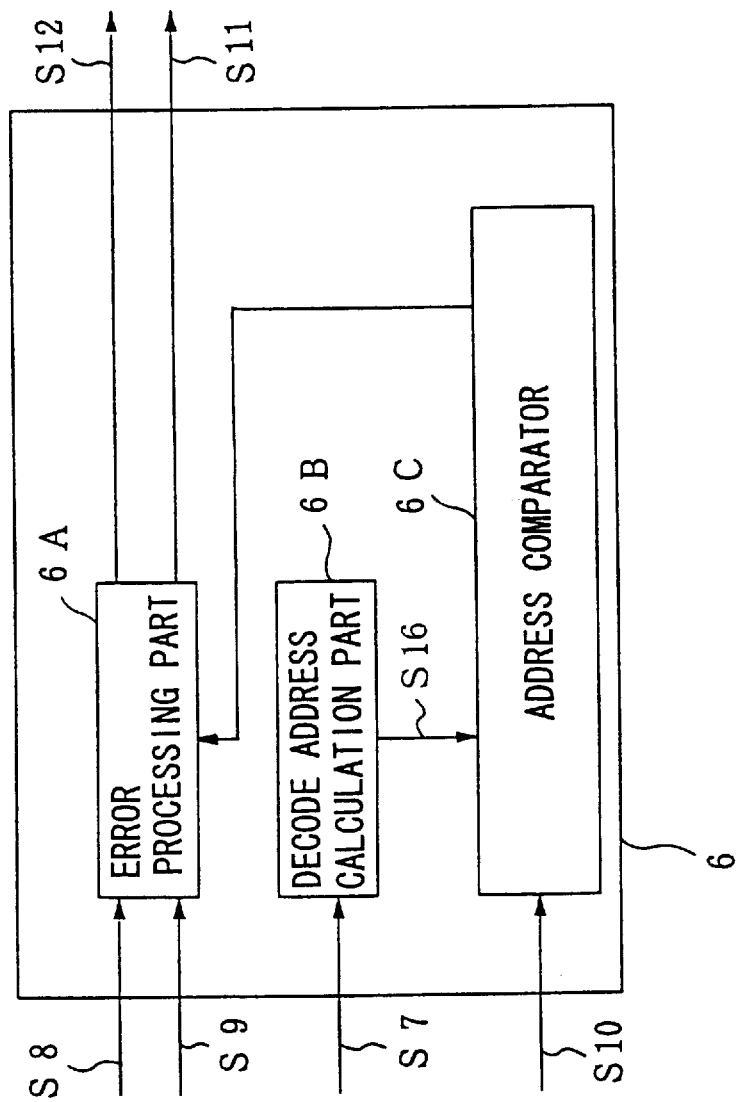
FIG. 7 is a block diagram showing an internal circuit of a decode control circuit.

The decode control circuit 6 comprises three processing blocks such as an error processing part 6A, a decode address calculation part 6B, and an address comparator 6C as shown in FIG. 7.

The error processing part 6A is a circuit which is used for the interruption of the decoding operation in the variable length decoding circuit 3 when an error detection signal S8 is input from the variable length decoding circuit 3, and controls the decode start signal S12 in accordance with the error detection signal S8. For reference, the error detection signal S8 is a signal output when an error start code is included in the bit stream which is input to the variable length decoding circuit 3 and when an error is detected in the variable length decoding operation.

Furthermore, since the error processing part 6A resumes the variable length decoding operation which is suspended with the decode start signal S12 at an appropriate position, the synchronous code search signal S11 is output to the variable length decoding circuit 3.

The error processing part 6A is constituted to control the operation mode of the variable length decoding circuit 3 with the synchronous code search signal S11 to a mode of searching the synchronous code from the bit stream.

Furthermore, the error processing part 6A inputs the synchronous code detection/judgement signal S9 output upon the detection of the synchronous code by the variable length decoding circuit 3 to judge the type of the synchronous code detected by the variable length decoding circuit 3 in accordance with the synchronous code detection/judgement signal S9.

For example, in the case where the type of the synchronous code detected is the error start code DES, the error processing part 6A is controlled to continue the search of the synchronous code.

In contrast, in the case where the synchronous code thus detected is a slice header, it is judged whether or not the search of the synchronous code is continued on the basis of the comparison output of the address comparator 6C.

In the case where neither of the invention can be valid, the decoding operation is resumed from the start of the frame.

The comparative output from the address comparator 6C is obtained by comparing the macroblock address S10 and the decode address S16.

For reference, the macroblock address S10 is obtained from the slice header following the synchronous code and the macroblock header. In addition, the decode address S16 is a count value of the macroblock decode end signal S7 output every time the macroblock processing is completed. The value represents a position on the screen where the variable length decoding circuit 3 actually decode the image data.

(1-2-2) Treatment Operation

Figure 8:
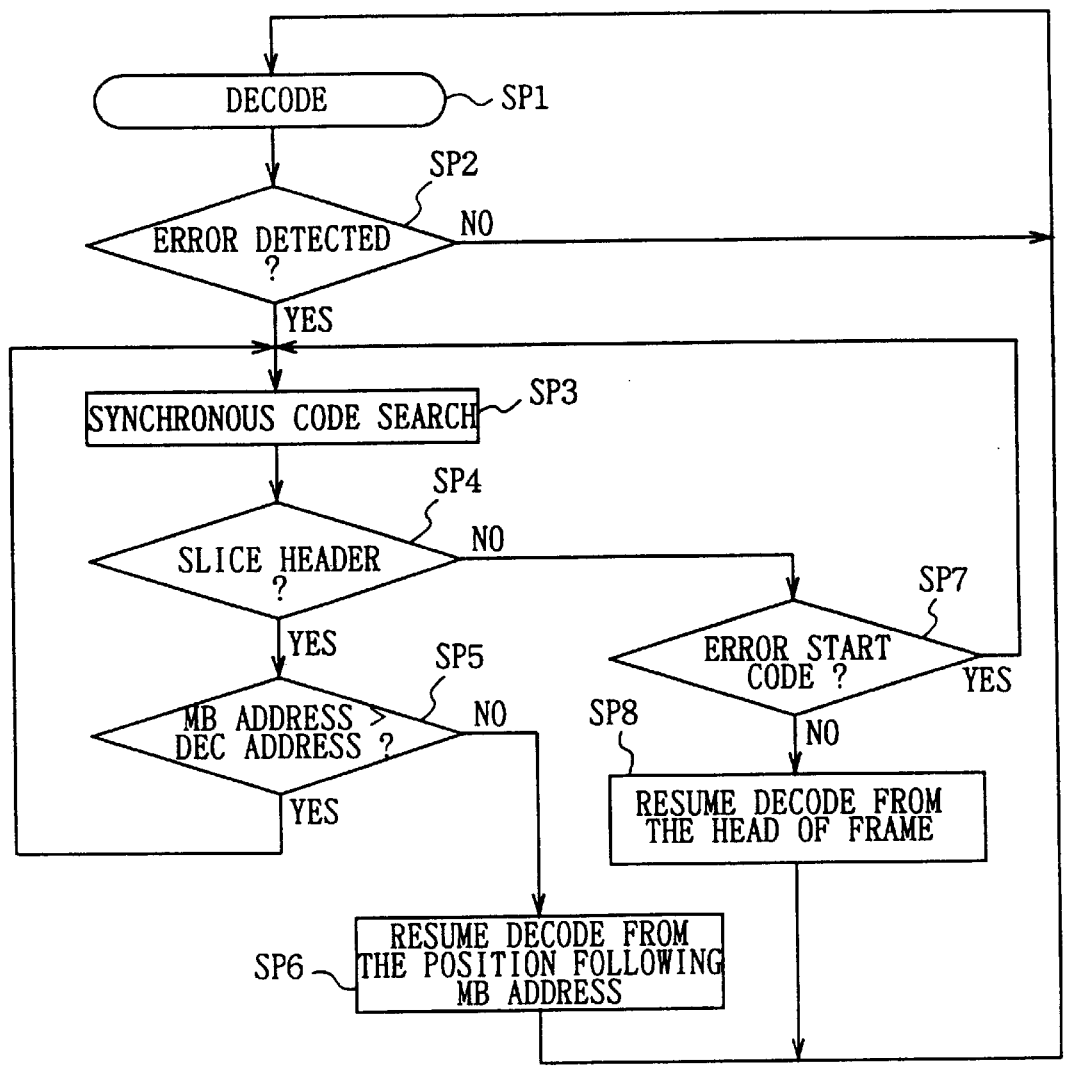
FIG. 8 is a flowchart showing a state transition of a processing in a decode control circuit.

Next, a series of processing states performed at the decode control circuit 6 will be explained by using FIG. 8. As shown in step SP1 to SP2, the decode control circuit 6 instructs the variable length decoding circuit 3 to perform the decoding operation and to judge whether or not an error is detected. Here, when the error processing part 6A detects the presence of an error from the error detection signal S8, the processing proceeds to step SP3 to suspend the decoding operation of the variable length decoding circuit 3, and at the same time, shifts a mode to the mode of searching the synchronous code.

Subsequently, the decode control circuit 6 judges whether or not the synchronous code detected on the basis of the synchronous code detection/judgement signal S9 input to the error processing part 6A belongs to the slices header.

When an affirmative result is obtained (or in the case of the slice header), the decode control circuit 6 proceeds to step SP5 to compare the decode address counted at the decode address calculation part 6B with the macroblock address at the position where the synchronous code is detected.

Here, in the case where an affirmative result is obtained (in the case where the macroblock address in the detected synchronous code part is smaller than the macroblock address obtained by the time of the suspension), when the decoding operation is resumed from the detected synchronous code position, a destruction is generated in the decoding processing time after resuming the operation. Consequently, the decode control circuit 6 returns to step SP3 and proceeds to the retrieval of the subsequent code.

In contrast, in the case where a negative result is obtained at step SP5 (in the case where the macroblock address of the detected synchronous code part is larger than the macroblock address obtained by the time of the suspension), the decode control circuit 6 proceeds to step SP6 to control the decode start signal S12 so as to resume the decode from the macroblock address obtained following the detected synchronous code. After this, the processing of the decode control circuit 6 returns to step SP1.

The above described explanation is given on a case where the judgement result at step SP4 is in the affirmative, or a case in which the read synchronous code is the synchronous code of the slice header. When a negative result is obtained in this stage, the processing of the decode control circuit 6 proceeds to step SP7.

At step SP7, the decode control circuit 6 judges whether or not the read synchronous code is one which is included in the error start code.

If an affirmative result is given at this time, or if the synchronous code is one which is included in the error start code, the decoding operation is not continued as it is. Consequently, the processing of the decode control circuit 6 returns to step SP3 again. Then, the decode control circuit 6 proceeds to the synchronous code detection operation for detecting the synchronous code of the target slice header.

In contrast, if a negative result is obtained at step SP7, or if the synchronous code is not the synchronous code of the slice header nor the synchronous code of the error start code (this means that the synchronous code is one on the upper layer higher than the slice and in this case the header is the frame header), the decode control circuit 6 proceeds to the processing of step SP8 to control the decode start signal S12 so as to resume the variable length decoding operation from the start of the frame without any conditions.

The decode control circuit 6 is operated so that a series of processing time in the decode processing circuit 1 can be included in a predetermined time by controlling the variable length decoding circuit 3 on the basis of a series of these state transitions.

(2) Decoding Operation Example

In the aforementioned structure, an explanation is given on a decoding operation example of the decode processing circuit 1 by using FIGS. 9A to 9C. Here, FIG. 9A shows a processing timing in a case where a normal decoding operation is performed in which no data error is included in the bit stream and no error is generated in the decoding operation. FIG. 9B is a decoding operation example which is conventionally used. As shown in FIG. 9B, a delay is generated in the midway with respect to time at which the processing is to originally ended in the case of the prior art. For example, the time at which the 77th decoding processing is completed is delayed by four macroblocks with respect to the original time.

In contrast, the decoding operation of the decode processing circuit 1 is shown in FIG. 9C. In the case of this decode processing circuit 1, an operation up to the detection of the slice over by the decoding operation is the same as shown in FIG. 9B.

At this time, the variable length decoding circuit 3 notifies the error processing part 6A of the decode control circuit 6 of an error such as slice over or the like by transmitting an error detection signal S8. Then, the error processing part 6A suspends the decoding operation of the variable length decoding circuit 3 by controlling the decode start signal S12 on the basis of the error detection signal S8.

In addition, together with this, the error processing circuit 6A outputs the synchronous code search signal S11 to shift the variable length decoding circuit 3 to the search mode of the synchronous code.

Here, in the beginning, the synchronous header of the slice header provided at the head of the subsequent slice is read as the synchronous code with the result that the macroblock (MB) address representing the first macroblock is input to the address comparator 6C.

For reference, this macroblock address becomes 51.

The address comparator 6C compares this macroblock address S10 with the decode address determined on the basis of the macroblock decode end signal S7. Since the decode processing is completed at "53th" processing, the judgement result of the step P5 becomes affirmative. In other words, since it is made clear that the processing time of the error processing circuit 6A is doubled when the decoding operation is resumed from the slice which starts with the macroblock address "51", the synchronous code search signal S11 and the decode start signal S12 are controlled to jump this slice part.

In FIG. 9C, thereafter, the slice whose macroblock address starts from "62" is detected from the retrieval of the synchronous code to resume the decoding operation from this slice.

As a result, the time at which processing is completed with respect to 77th macroblock located at the end of this frame is prior to the termination time provided in FIG. 9A so that the generation of the destruction in the decoding operation can be avoided.

In the aforementioned structure, in the case where an error is detected in the variable length decoding operation of the bit stream, the resuming position of decode processing is set on the basis of the address (decode address) of the macroblock which has been processed immediately before the detection of the error, so that the decoding operation of the bit stream after resuming the processing can be included within time of one frame. Therefore, a decoding processing circuit can be realized without any trouble in the decoding operation with any frame irrespective of the existence of error generated in the data and the decoding operation.

Furthermore, the resuming position can be retrieved in short time by setting the resuming position of the decoding processing to the synchronous code which is inserted into the bit stream.

In addition, when the resuming position of the decoding operation is set, the possible position that can be selected as a position for resuming the decoding processing, which has been obtained by detecting the synchronous code, is compared with the image position where the processing is completed immediately before an error is detected, and jumps the decoding operation of the bit stream until the selected image position is located at the back of the former image position on the time axis, so that the overlapping of the image position to be decoded can be surely avoided.

(3) Other Embodiments

The aforementioned embodiment has dealt with the case where the data structure of the bit stream is formed of three layers of the macroblock, the slice and the frame. However, this invention is not limited to this, but this invention can be applied to a bit stream having a larger number of layers structure.

In this case, the restoration position of the variable length decoding operation can be started with the header which represents the intermediate layer of the slice header, the frame header or the like.

Further, the aforementioned embodiment has been dealt with the case where an error is detected in the variable length -decoding operation, or the case where the resuming position is determined so that the decoding processing is suspended and the processing time thereafter can be included in a predetermined time. However, this invention is not limited to this, but this invention can be widely applied to a case in which an error is detected in the decoding operation other than the variable length decoding operation.

Furthermore, the aforementioned embodiment has been dealt with the case where IDCT processing is performed as a processing after the inverse quantization processing. However, in the case where an orthogonal transform coding method other than the DCT at the time of coding is used, an inverse transform processing can be performed in accordance to it.

Furthermore, the aforementioned embodiment has been dealt with the case of the decoding of the video signal primarily. However, this invention is not limited to this, but this invention can be applied to the decoding processing of audio signals and control signals which are transmitted together with the video signal.

As described above, according to this invention, the resuming position of the decoding operation is determined in accordance with the error detection position, and the decoding operation of a series of data group including an error part of the bit strings is completed within a predetermined time, so as to realize a video signal decoding method and a video signal decoding apparatus which are capable of completing the decoding operation of the bit strings within the predetermined time which is set in advance.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A method for performing a decoding operation for decoding and outputting bit strings of a video signal coded for each of a plurality of predetermined blocks of a series of data groups, said method comprising the steps of:

defining an end of a slice of data;

associating at least one of said plurality of predetermined blocks with said slice;

designating a predetermined time during which said at least one of said predetermined blocks associated with said slice of data is decoded;

determining whether an error exists during said decoding operation, said error being defined by at least one of said predetermined blocks associated with a particular slice is decoded after said designated predetermined time;

suspending said decoding operation upon the determination of an error;

determining from which synchronous code out of a plurality of synchronous codes present in said bit strings the decoding operation is to be resumed; and resuming the decoding operation from the determined synchronous code.

2. The method for decoding the video signal according to claim 1 wherein a resuming position of said decoding operation is determined in response to a position relation between the position in the image where the decoding operation has been already completed when the error is detected and the image position decoded from the bit strings following the synchronous code part present after the error is detected.

3. The method for decoding the video signal according to claim 2 wherein a first image position read from said synchronous code part is compared, every time the synchronous code is detected after said error position, with a second image position where the decoding operation has been already completed when said error is detected so that the decoding operation is skipped until resuming the position of said first image on the time axis is located after said second image position.

4. A video signal decoding apparatus for decoding a series of data comprising bit strings formed by coding a video signal for each of a plurality of predetermined blocks and for outputting said decoded bit strings, said video signal decoding apparatus, comprising:

means for defining an end of a slice of data;

means for associating at least one of said plurality of predetermined blocks with said slice;

time designation means for designating a predetermined time during which said at least one of said predetermined blocks associated with said slice of data is decoded;

error determination means for determining whether an error is encountered by said video signal decoding apparatus during a decoding operation, said error being defined by at least one of said predetermined blocks associated with a particular slice is decoded after said designated predetermined time, said video signal decoding apparatus being suspended from performing a decoding operation upon the determination of an error;

means for determining from which synchronous code out of a plurality of synchronous codes present on said bit strings a decoding operation is to be resumed.

5. The video signal decoding apparatus according to claim 4 wherein said video signal decoding apparatus determines a resuming position of said decoding operation, in response to a position relation between the image position where the decoding operation has been already completed when said error is detected and the image position decoded from the bit strings following the synchronous code part present after said error position.

6. The video signal decoding apparatus according to claim 5 wherein said decoding means compares the first image position read from said synchronous code part every time the synchronous code is detected after said error position with the second image position where the decoding operation has been already completed at the time of the detection of said error thereby skipping a reading of the decoding operation of said bit strings until said first image position on the time axis is located at the back of said second image position.

7. A method for decoding a video signal in which bit strings of video signal coded for each predetermined block are sequentially decoded and outputted, said method comprising:

defining a predetermined time during which a predetermined portion of said bit strings of video signal are to be decoded;

detecting an error when at least a portion of said predetermined portion of said bit strings of video signal is decoded after said predetermined time;

suspending a decoding operation upon detecting said error;

determining a synchronous code in said bit strings located in said bit strings after a location of said detected error at which said decoding may resume; and resuming the decoding operation from said determined synchronous code.

* * * * *